United States Patent
Nedunuri

(10) Patent No.: US 11,644,392 B2
(45) Date of Patent: May 9, 2023

(54) ARRANGEMENT HAVING A SPECIMEN PLATE AND A TRANSPARENT MARKING FRAME

(71) Applicant: Leica Biosystems Nussloch GmbH, Nussloch (DE)

(72) Inventor: Krishna Kishore Nedunuri, Nussloch (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 189 days.

(21) Appl. No.: 16/930,417

(22) Filed: Jul. 16, 2020

(65) Prior Publication Data

US 2021/0025793 A1  Jan. 28, 2021

(30) Foreign Application Priority Data

Jul. 25, 2019 (DE) .................... 10 2019 120 201.9

(51) Int. Cl.
| | | |
|---|---|---|
| *G01N 1/06* | (2006.01) | |
| *G01N 1/28* | (2006.01) | |
| *G01N 35/00* | (2006.01) | |

(52) U.S. Cl.
CPC ............. *G01N 1/06* (2013.01); *G01N 1/2813* (2013.01); *G01N 35/00732* (2013.01); *G01N 2001/282* (2013.01)

(58) Field of Classification Search
CPC ...... G01N 2001/282; G01N 1/06; G01N 1/42; G01N 1/2813; G01N 35/00732; B01L 9/52; B01L 3/54
See application file for complete search history.

(56) References Cited

U.S. PATENT DOCUMENTS

| 1,343,051 | A | * | 6/1920 | Gosline | G01N 1/06 83/915.5 |
|---|---|---|---|---|---|
| 4,159,875 | A | | 7/1979 | Hauser | |
| 4,752,347 | A | * | 6/1988 | Rada | G01N 1/36 269/21 |
| 5,188,347 | A | * | 2/1993 | Hunnell | B25B 5/16 269/274 |
| 5,711,200 | A | * | 1/1998 | Thiem | G01N 1/06 83/915.5 |
| 5,983,991 | A | * | 11/1999 | Franks | G01N 1/06 165/185 |
| 7,760,428 | B2 | * | 7/2010 | Sieckmann | G01N 35/00871 359/368 |

(Continued)

FOREIGN PATENT DOCUMENTS

DE  102014200448 A1  7/2015

*Primary Examiner* — Michael P LaPage
(74) *Attorney, Agent, or Firm* — Hodgson Russ LLP

(57) ABSTRACT

The invention relates to an arrangement having a specimen plate (1) for freezing on a sample for processing in a microtome, which has an upper side (4) for freezing on the sample and a lower side (5), and having a transparent marking frame (6), having opaque regions forming a marking, which is arranged on the specimen plate (1); and to a method for assigning a sample after freezing onto that specimen plate; and to a method for identifying a sample that is frozen onto that specimen plate (1), the marking frame being arranged on the lower side (5) of the specimen plate (1) or so as to fit around the specimen plate (1).

15 Claims, 3 Drawing Sheets

(56) References Cited

U.S. PATENT DOCUMENTS

| | | | |
|---|---|---|---|
| 2002/0154399 A1* | 10/2002 | Eastman | G02B 21/34 |
| | | | 359/398 |
| 2005/0159982 A1* | 7/2005 | Showalter | G16H 10/40 |
| | | | 705/2 |
| 2006/0123800 A1 | 6/2006 | Metzner | |
| 2009/0019865 A1 | 1/2009 | Henderson et al. | |
| 2009/0210254 A1 | 8/2009 | Gurney | |
| 2010/0086964 A1 | 4/2010 | Walter et al. | |
| 2013/0078669 A1 | 3/2013 | Heid et al. | |
| 2015/0104596 A1 | 4/2015 | Vogel | |
| 2015/0268315 A1* | 9/2015 | Tramm | G01N 24/08 |
| | | | 324/309 |
| 2020/0298240 A1* | 9/2020 | Oshinski | B01L 9/00 |

\* cited by examiner

ARRANGEMENT HAVING A SPECIMEN PLATE AND A TRANSPARENT MARKING FRAME

CROSS REFERENCE TO RELATED APPLICATION

This application claims priority of German patent application number 10 2019 120 201.9 filed Jul. 25, 2019, the entire disclosure of which is incorporated by reference herein.

FIELD

The present invention relates to an arrangement having a specimen plate for freezing on a sample for processing in a microtome; to a method for assigning a sample after freezing onto a specimen plate; and to a method for identifying a sample that is frozen onto a specimen plate and has been assigned to that specimen plate.

BACKGROUND

A microtome is a cutting device with which very thin prepared sections can be produced. It serves to produce microscopic prepared specimens that, for example, are later to be transilluminated, for example biological tissue. Typical areas of application are, in particular, soft materials and substances, for example from medicine and biology, such as analysis of plastics.

The thickness of the sections is considerably less than the diameter of a human hair, and is typically between 0.1 and 100 µm. The utilization of a microtome is referred to as "microtomy."

Low-temperature microtomes or cryomicrotomes, which are usually cooled with a refrigeration device having a compressor/evaporator, are utilized for cutting frozen samples. The low temperature is used to increase the hardness of the sample and make it cuttable. A cryostat having a microtome is shown in DE 10 2004 056 189 A1.

For processing in cryomicrotomes or cryostat microtomes of this kind, the tissue that is to be prepared is frozen, using a freezing medium, onto a specimen plate made of a material having good thermal conductivity. A freezing bar, into or onto which the specimen plates are placed so that heat exchange occurs, is arranged for that purpose in the cryomicrotome or cryostat microtome. After freezing of the sample onto the specimen plate, the specimen plate is usually clamped into a specimen holder of a microtome integrated into the cryostat, and the sample is processed with the microtome. Because the samples often cannot be differentiated visually, however, confusion among various samples can occur. A solution for improving the ability to differentiate the sample is therefore desirable.

US 2009 0 019 865 A1 discloses an arrangement having a specimen plate for freezing on a sample for processing in a microtome, which plate has an upper side for freezing on the sample and a lower side. A sample container can be made of transparent plastic that can serve as a writing surface. The arrangement can be arranged on the sample holder.

DE 10 2014 200 448 A1 discloses prepared-specimen carrier elements that are equipped with a barcode.

SUMMARY

The present invention proposes an arrangement having a specimen plate; a method for assigning a specimen; and a method for identifying a sample, having the features of the independent patent claims. Advantageous embodiments are the subject matter of the dependent claims and of the description that follows.

The invention makes use of the feature of equipping a specimen plate with a marking. This marking is embodied in the form of opaque regions of a transparent marking frame on the specimen plate. By way of different arrangements of the opaque regions, it is possible to generate different patterns or markings, and thus distinguish different marking frames and the associated specimen plates or samples.

According to the present invention, the marking frame is arranged on the lower side of the specimen plate. In particular, the horizontal extent of the arrangement can thereby be kept compact. Provision can be made, for example, that the marking frame is clamped, suspended, bolted, or clipped onto the lower side of the specimen plate. The marking frame can also, for example, fit around a holder, for instance a shank, on the lower side of the specimen plate.

Alternatively, it is also in accordance with the present invention if the marking frame is arranged to fit around the specimen plate. With this embodiment it is also possible, in particular, to read the marking from the side or from the top if desired.

The opaque regions are preferably placed in the marking frame in such a way that the marking is detectable, in particular visible, on a lower side of the marking frame. In particular, the opaque regions can be arranged on the lower side, although an arrangement inside the transparent material of the marking frame, or on its upper side, is also possible provided it is detectable from the lower side. The marking can thus very easily be read from below so that, in particular, working steps on the upper side of the marking frame and, in particular, of the specimen plate, are not interfered with.

The marking frame is preferably recessed, preferably clamped, into a recess in the specimen plate. This is advantageous because an additional expansion of the specimen plate as a result of the marking frame is thereby avoided.

In particular, the marking is embodied in such a way that it is detectable, upon lateral light irradiation into the transparent marking frame, by a light sensor. In particular, working steps on the upper side of the specimen plate are not interfered with by lateral light irradiation of this kind.

In particular, the marking is embodied in such a way that it is detectable, upon lateral light irradiation into the transparent marking frame, by a light sensor that is located below the marking frame and that in particular spans a portion of the marking frame in a radial direction. This is advantageous because automated sample assignment and sample identification are thereby possible.

The opaque regions preferably proceed in a circumferential direction on the marking frame. Detection of the marking can thus occur, in particular, at multiple points in a circumferential direction.

The marking is preferably embodied so that it is detectable at any point in a circumferential direction. For example, such a marking can be constituted by one or more encircling marking rings.

In a particularly advantageous embodiment, the specimen plate is embodied radially symmetrically. This is not, however, to be understood as a limitation. Rectangular and square specimen plates, and those having other shapes, are therefore also conceivable.

The frame is preferably embodied annularly in order to ensure heat exchange between the specimen plate and the freezing bar. This is advantageous because a marking, for instance in the form of encircling rings, can be applied particularly easily onto an annular shape. This is particularly advantageous in combination with a radially symmetrical specimen plate, but is not to be understood as a limitation. Square frames, and those of other shapes, are thus also conceivable.

Usefully, the transparent marking frame is made at least in part of plastic, for example Plexiglas. Plastic is advantageous because it is a break-resistant material and is easy to manufacture. Glass is also preferred as a material, however, since it can be particularly easily and effectively cleaned and disinfected.

In particular, the marking frame has a rectangular cross section. This permits particularly simple fabrication and good adaptability to the specimen plate. The marking frame then also has a flat lower side for application and/or detection of the marking.

In a particularly advantageous embodiment, the marking comprises opaque and preferably also transparent concentric circles. These are particularly suitable for furnishing, in the context of an annular frame, a radially symmetrical pattern that can be read out in the same way at each frame portion. The concentric circles preferably form a colored pattern, a light/dark pattern, and/or a grayscale pattern. Any number of individually coded specimen plates can be furnished by way of different numbers of concentric circles and/or different spacings between the circles and/or different colors. This is advantageous because each sample can thereby be unequivocally associated with an individually coded specimen plate.

According to a further preferred embodiment, the marking can also be a one-dimensional pattern such as a barcode, or a two-dimensional pattern such as a QR code. Such a marking can, in particular, be applied repeatedly over the circumference of the marking frame so as to be detectable as easily as possible.

Usefully, the marking is etched and/or printed on. These are particularly reliable and inexpensive methods for applying the marking.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment and will be described in detail below with reference to the drawings.

BRIEF DESCRIPTION OF THE DRAWING VIEWS

DETAILED DESCRIPTION

Figure 1:
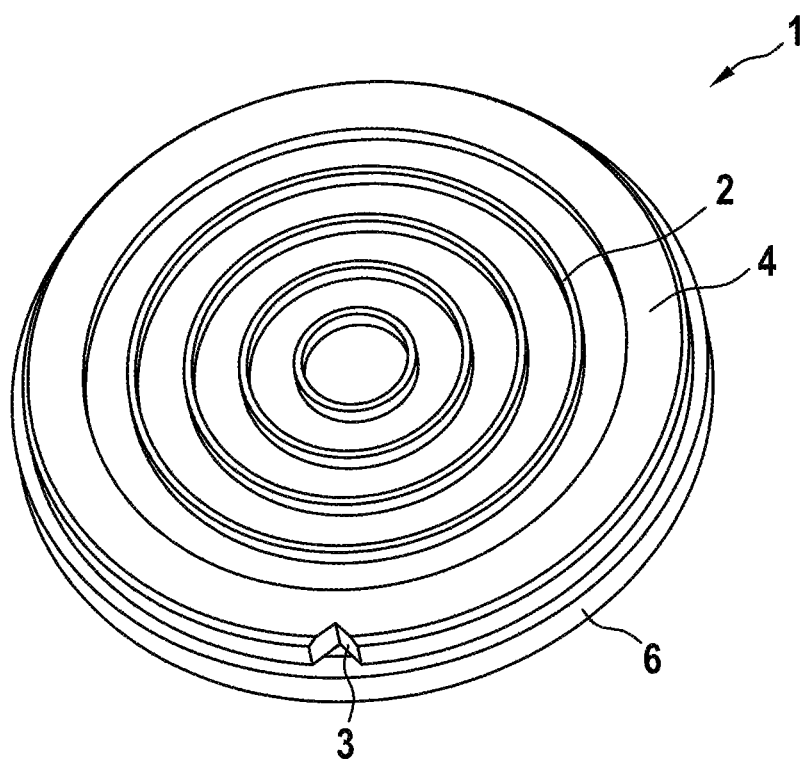
FIG. 1 is a perspective view, obliquely from above, of a preferred embodiment of an arrangement according to the present invention having a specimen plate and a marking frame.
Figure 2:
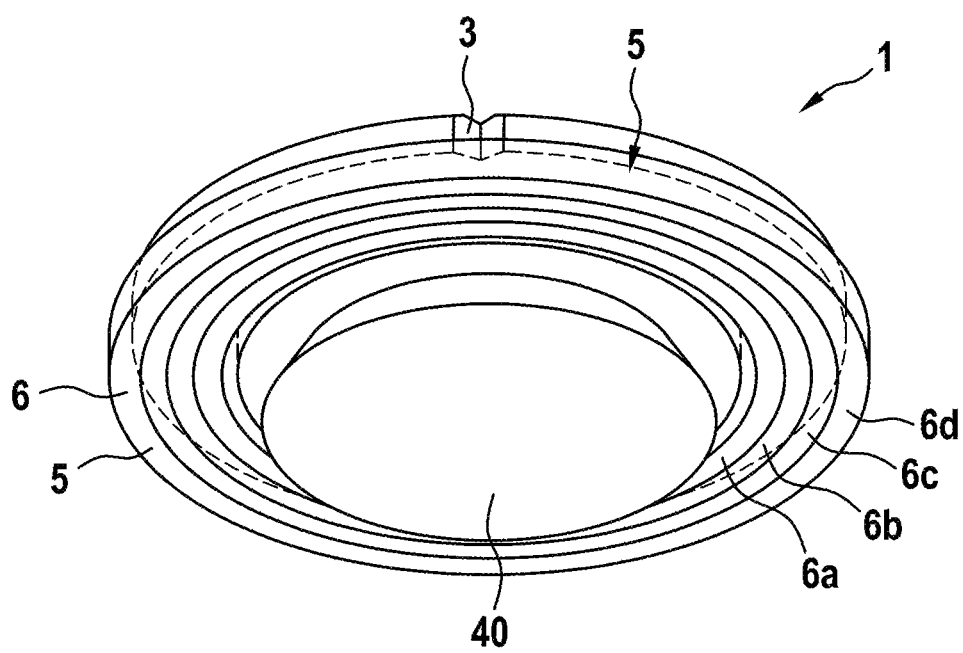
FIG. 2 is a perspective view, obliquely from below, of the arrangement of FIG. 1.
Figure 3:
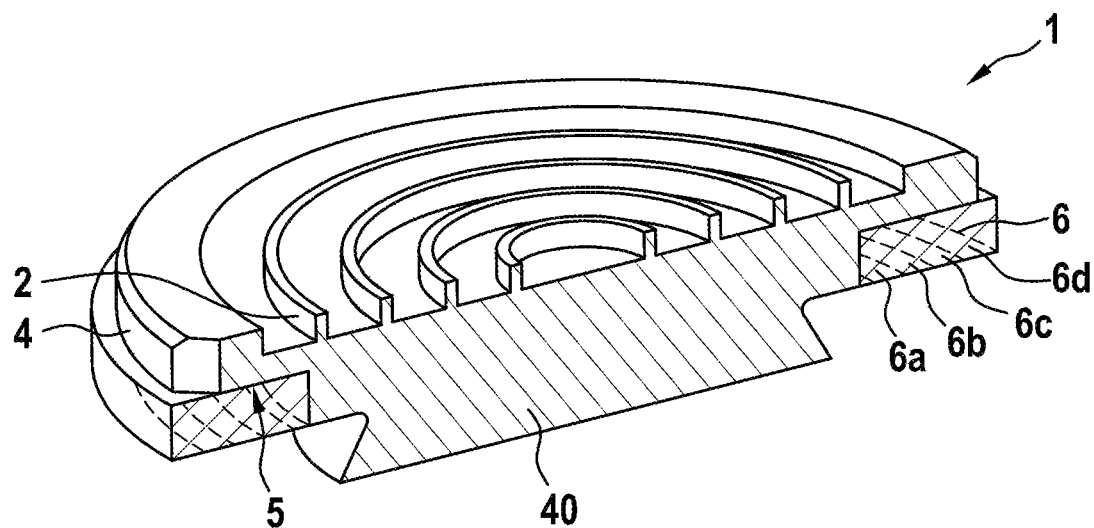
FIG. 3 is a perspective section view, obliquely from above, of the arrangement of FIG. 1.

A preferred embodiment of an arrangement according to the present invention having a specimen plate and a marking frame will now be described with reference to FIGS. 1 to 5.

A radially symmetrical, disk-shaped specimen plate for freezing on a sample for processing in a microtome is depicted in FIGS. 1 to 5 and labeled 1. This specimen plate 1 has, in an axial direction, an upper side 4 and a lower side 5. Specimen plate 1 has several concentric elevations 2 on upper side 4, this being particularly visible in FIGS. 1 and 3. This is advantageous in terms of good adhesion of a frozen-on sample onto specimen plate 1. Specimen plate 1 has, in a radial direction, a notch 3 that serves for lateral orientation of the tissue sample upon sectioning with the microtome.

The specimen plate comprises, on its lower side 5, an annular transparent marking frame 6. The latter is embodied in particular from plastic or glass and has a rectangular cross section, as is evident from FIG. 3. It surrounds or clamps around a shank 40 of specimen plate 1. Frame 6 comprises on the lower side a marking that is constituted by a radially symmetrical coded pattern. The latter is made up here of concentric opaque circles 6a, 6c between or next to which transparent regions 6b, 6d are located. The opaque regions are preferably printed or etched onto the frame. Concentric circles 6a, 6b, 6c, 6d here form, for example, a colored pattern, a light/dark pattern, or a grayscale pattern. For example, a first circle 6a is blue, a second circle 6b is transparent and colorless, a third circle 6c is red, and a fourth circle 6d is transparent and colorless. The radial extents of the individual circles 6a, 6b, 6c, 6d can also differ. By varying, for example, the colors and spacings of the concentric circles it is possible to differentiate a large number of specimen plates, and each specimen plate can be individually identified and assigned to a specific sample. Conversely, an assigned sample can be identified by way of the marking.

Figure 4:
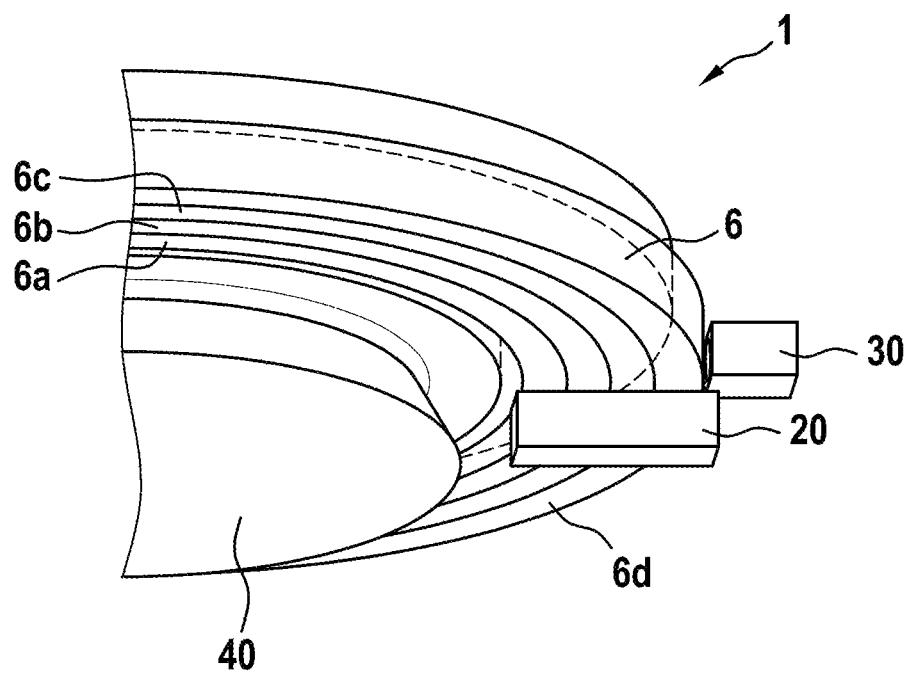
FIG. 4 is a perspective view, obliquely from below, of a portion of a preferred embodiment of an arrangement according to the present invention while a preferred embodiment of a method according to the present invention is being carried out.
Figure 5:
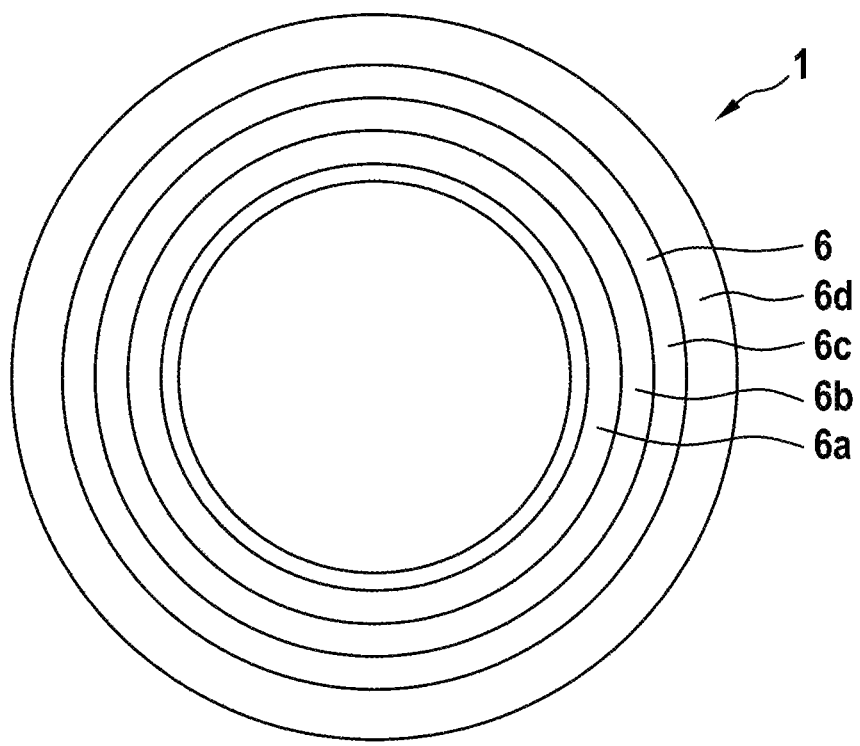
FIG. 5 is plan view of the arrangement of FIG. 1.

An embodiment of a method according to the present invention for assigning a sample after freezing onto a specimen plate will now be described with reference to FIG. 4. FIG. 4 depicts, in addition to the arrangement made up of specimen plate 1 and marking frame 6, a light source 30 and a light sensor 20. When light is irradiated (in this case, laterally) by means of light source 30 into transparent frame 6, the marking on the transparent frame lights up in such a way that it is detectable or readable by light sensor 20, which is located below frame 6 and spans a portion of frame 6 in a radial direction. The marking is thus detected by light sensor 20.

In the next step, an assignment is created—for instance, noted or stored in a database—between the read-out marking and the sample. This can be accomplished, for example, in computer-controlled fashion by the fact that a user is prompted to input a designation for the sample on a keypad, or to scan the barcode supplied with the sample, for instance the code applied onto the sample transport vessel. A computer program, for instance, then stores an assignment of the read-out marking to the designation for the sample.

Preferably the assignment is stored in only explicitly deletable fashion, i.e. inadvertent overwriting of an existing assignment cannot take place. Instead, existing assignments must firstly be explicitly deleted before the specimen plate can be assigned to another sample, and vice versa.

To further enhance operating reliability, provision can be made that the creation of an assignment between a sample and a specimen plate is rejected if an assignment of the sample or the specimen plate already exists, and a warning message is issued. Usefully, the warning message is entered into a log and the log is stored. It is thus possible to determine later, if applicable, if samples have ended up on incorrect specimen slides.

For later identification of a sample that has been frozen onto a specimen plate 1, light is irradiated laterally by means of light source 30 into the transparent marking frame 6, and the marking is detected.

What is claimed is:

1. A method for assigning a sample to a specimen plate for freezing on the sample for processing in a microtome, the method comprising the steps of:
   providing an arrangement comprising the specimen plate having an upper side for freezing on the sample and a lower side, and the specimen plate further having a shank on the lower side thereof, and a transparent marking frame arranged on the specimen plate, the marking frame having opaque regions forming a marking, wherein the opaque regions forming the marking proceed in a circumferential direction on the transparent marking frame, wherein the transparent marking frame is arranged on the lower side of the specimen plate and surrounds the shank of the specimen plate;
   illuminating the transparent marking frame on the specimen plate by light irradiation from a light source;
   detecting the marking by means of a light sensor, wherein the marking is detectable by the light sensor at any point in a circumferential direction on the transparent marking frame; and
   creating an assignment between the sample and the marking.

2. The method according to claim 1, wherein the assignment is created before or after freezing the sample onto the specimen plate.

3. The method according to claim 1, further comprising the step of storing the assignment in only explicitly deletable fashion.

4. The method according to claim 3, wherein creation of an assignment is rejected and a warning message is issued if an assignment of the sample or the specimen plate already exists.

5. The method according to claim 4, wherein the warning message is entered into a log and the log is stored.

6. The method according to claim 1, further comprising the step of identifying the sample on the basis of the assignment.

7. The method according to claim 1, wherein the transparent marking frame is permanently arranged on the specimen plate.

8. The method according to claim 1, wherein the specimen plate is radially symmetric.

9. The method according to claim 1, wherein the transparent marking frame is annularly shaped.

10. The method according to claim 1, wherein the transparent marking frame is made at least in part of plastic or glass.

11. The method according to claim 1, wherein the transparent marking frame has a rectangular cross section.

12. The method according to claim 1, wherein the marking comprises concentric circles.

13. The method according to claim 12, wherein the concentric circles form a colored pattern, a light/dark pattern, and/or a grayscale pattern.

14. The method according to claim 12, wherein the transparent marking frame is received into a recess in the specimen plate.

15. The method according to claim 1, wherein the marking is etched and/or printed on the transparent marking frame.

* * * * *